US005597856A

United States Patent [19]
Yu et al.

[11] Patent Number: 5,597,856
[45] Date of Patent: Jan. 28, 1997

[54] HOT MELT INK FOR TRANSPARENCY APPLICATIONS

[75] Inventors: Kelvin W. Yu, West Hills, Calif.; Susan Schnitzel, Linthicum, Md.

[73] Assignee: Dataproducts Corporation, Simi Valley, Calif.

[21] Appl. No.: 126,578

[22] Filed: Sep. 24, 1993

[51] Int. Cl.$^6$ .............................. C08K 5/20; C09D 11/10; C09D 11/12; C09D 11/02

[52] U.S. Cl. ................. 524/227; 106/200.3; 106/22 A; 106/22 H; 106/23 A; 106/31 R; 523/160; 523/161; 524/210; 524/211; 524/221; 524/222; 524/223; 524/226; 524/230

[58] Field of Search ............................. 523/160, 161; 106/20 D, 22 A, 22 H, 23 A, 31 R; 524/210, 221, 222, 223, 226, 227, 230

[56] References Cited

U.S. PATENT DOCUMENTS

| | | | |
|---|---|---|---|
| 2,948,698 | 8/1960 | Cocci | 524/227 |
| 3,156,572 | 11/1964 | Carlick et al. | 106/27 R |
| 3,244,734 | 4/1966 | Sonntag | 106/20 R |
| 3,383,391 | 5/1968 | Carlick et al. | 106/27 R |
| 3,420,789 | 1/1969 | Wilson | 106/27 R |
| 3,522,270 | 7/1970 | Glaser | 106/27 R |
| 3,622,604 | 11/1971 | Drawert et al. | 106/27 R |
| 3,652,469 | 3/1972 | Glaser et al. | 106/27 R |
| 3,793,270 | 2/1974 | Goukon et al. | 106/27 R |
| 4,390,369 | 6/1983 | Merritt et al. | 106/31 R |
| 4,400,216 | 8/1983 | Arora | 106/30 R |
| 4,484,948 | 11/1984 | Merritt et al. | 106/31 R |
| 4,703,335 | 10/1987 | Matsushita et al. | 503/204 |
| 4,741,930 | 5/1988 | Howard et al. | 428/195 |
| 4,830,671 | 5/1989 | Frihart et al. | 106/31 R |
| 4,853,706 | 8/1989 | Van Brimer et al. | 347/102 |
| 4,889,560 | 12/1989 | Jaeger et al. | 106/27 R |
| 5,194,638 | 3/1993 | Frihart et al. | 554/47 |
| 5,350,789 | 9/1994 | Sagawa et al. | 524/313 |

FOREIGN PATENT DOCUMENTS

| | | | |
|---|---|---|---|
| 4301706 | 7/1993 | Germany | 106/20 D |

*Primary Examiner*—Peter A. Szekely
*Attorney, Agent, or Firm*—Loeb & Loeb LLP

[57] ABSTRACT

Phase change inks capable of passing light therethrough are suitable for color overhead transparencies, as well as plain paper printing. A composition for the ink carrier comprises an unsaturated bis-amide as a transparency enhancer, a low viscosity monoamide as a thinner material, and a polyamide resin as a base and binder.

14 Claims, No Drawings

HOT MELT INK FOR TRANSPARENCY APPLICATIONS

BACKGROUND OF THE INVENTION

1. Field of the Invention

The present invention relates to hot melt ink formulations, and, in certain embodiments, to hot melt ink formulations in which the ink is light transmissive and can be used, for example, on overhead transparency film, plain paper or backlit displays.

2. The Related Art

Various types of inks have been developed which have been found to be suitable for many types of ink jet printing. Because ink jet devices typically include relatively narrow passages and channels and small orifices through which liquid ink is passed, ink jet inks are generally designed to avoid clogging and to smoothly flow through such narrow passages, channels and orifices. Moreover, ink which has a stable, consistent viscosity is desirable for maximum print quality.

One problem encountered with various prior art inks which contain water or organic solvents is that these inks tend to dry out over time. This can result in dried ink blocking various passages, channels or orifices in the printer. In addition, the loss of volatile solvents can change the viscosity of the ink, which in turn may degrade the performance of the ink and result in poor adhesion to the substrate.

Hot melt inks are typically solid phase at room temperature and liquid phase at the elevated operating temperature of the printer. Examples of such hot melt inks are described in U.S. Pat. No. 3,156,572 to Carlick and Dover. Hot melt inks offer several advantages over conventional liquid inks. First, hot melt inks remain solid during transportation and storage, and will not evaporate like conventional inks do. Thus reliability of the printer is improved because problems associated with nozzle clogging due to evaporation of components of the ink composition are largely eliminated. Furthermore, the ink droplets tend to solidify almost immediately upon contact with the substrate material, which prevents unwanted migration of the ink along the substrate surface and improves the quality of the print.

U.S. Pat. Nos. 4,830,671 and 5,194,638 to Frihart et. al. describes hot melt ink compositions containing a tetra-amide and a colorant. U.S. Pat. No. 4,390,369 to Merritt et al. describes the use of a number of natural waxes, such as Japan wax, candelilla wax, and carnauba wax. These waxes are used as either the ink vehicle or as an additive to other carriers such as fatty acid materials.

None of the above references describe an ink composition or ink carrier for light transmissive inks for use in, for example, overhead transparency applications. Many traditional phase change ink compositions are not particularly light transmissive and thus not effective for creating color transparencies. However, U.S. Pat. No, 4,889,560 to Jaeger et al. describes an ink carrier composition for light transmissive phase change inks, containing both a tetra-amide and a monoamide. Inks made from such compositions, however, have been found to be less light transmissive and durable as desired for many applications.

It would be desirable to have an ink carrier formulation which is highly light transmissive and highly durable. It is to these types of objectives that embodiments of the present ink formulation is directed.

SUMMARY OF THE DISCLOSURE

Embodiments of the present invention relate to phase change inks and ink carriers which can transmit light and be used to convey color images using conventional projection techniques. In certain embodiments of the present invention, the composition of the ink carrier comprises an unsaturated bis-amide as a transparency enhancer, a monoamide as a thinner material, and a polyamide resin as a base and binder.

In one embodiment, the unsaturated amide is a synthetic wax, ethylene bis-oleamide, and monoamide thinner is a low viscosity hydroxyamide. One or more dyes are added to the ink carrier to obtain a colored transparent ink.

It has been found that an ink according to such a composition provides improved light transmission and durability and may be used for color printing both on film for overhead transparencies and on plain paper.

DETAILED DESCRIPTION OF THE PREFERRED EMBODIMENTS

The following description is the best mode contemplated for carrying out the present invention. This description is made for the purpose of illustrating principles of embodiments of the invention and should not be taken in a limiting sense. The scope of the invention should be determined by reference to the appended claims.

An ink carrier according to a preferred embodiment of the present invention comprises an unsaturated bis-amide as a transparency enhancer, a low viscosity hydroxy amide as a thinner material, and a polyamide resin as a base and binder.

In one aspect of the invention, the transparency enhancer improves certain physical properties of the carrier, such as the light transmissivity and the flexibility. Inks made according to embodiments of the present invention may be used for a variety of uses, including but not limited to color overhead projection, plain paper printing, and backlit displays. Embodiments of inks according to the present invention may be used in conventional hot melt ink printers, where the ink is heated to a temperature of above about 120° C., then jetted onto a substrate such as transparency film PP2500 by 3M. The same ink may have the versatility to be used for regular printing and overhead color projections.

In one aspect of the present invention, it is believed that the unsaturated structure (carbon-carbon double bonds) of the transparency enhancer used in embodiments of the present invention contributes to the enhanced properties of the carrier.

In another aspect, the thinner material acts a solvent to dissolve the resin material. The base and binder material also contributes to the transparency of the composition, and is chosen to insure good adhesion of the ink to the substrate.

In one preferred embodiment of the present invention, the unsaturated bis-amide material used as a transparency enhancer is a synthetic amide wax, for example, Glycolube VL, which is manufactured by Lonza, Inc. Glycolube VL is an ethylene bis-oleamide, with the following chemical formula: $(CH_3)—(CH_2)_7—(CH)=(CH)—(CH_2)_7—(C=O)—(NH)—(CH_2)—(CH_2)—(NH)—(C=O)—(CH_2)_7—(CH)=(CH)—(CH_2)_7—(CH_3)$; which can also be written as $C_2H_4(NHCOC_{17}H_{33})_2$. In further embodiments of the present invention, other unsaturated amides may be used as alternatives to Glycolube VL. For example, other unsaturated amides similar to Glycolube VL include Crodamide EBO, manufactured by Croda, Inc., and Kemamide W-20, manufactured by Witco Chemical Co. Alternatively, other unsaturated amide structures, including oleamide, manufactured by Unichema Chemicals, and erucamide, manufactured by Witco Chemical Co., could also be used.

A variety of thinner materials may be used, including a low viscosity monoamide. One preferred thinner is a hydroxyamide, CPH-380N, manufactured by C. P. Hall. Other amide thinners can be used, such as Stearamide Kemamide S-180, manufactured by Witco, and Paricin 220 or 280, manufactured by CAS Chemicals.

A polyamide resin is used as the base or binder component. The polyamide resin may be, preferably, Sylvamid E-5, manufactured by Arizona Chemical. Other resins could also be used, including several other varieties of Sylvamid, Versamid (manufactured by Henkel Chemical), and Polymid (manufactured by Lawter Chemical).

In addition,, various dye or coloring materials may be included in the composition, depending on the color desired. Some preferable dyes include SR-49 (Neptun Red Base NB 543, from BASF), SB-70 (Neopen Blue 808, from BASF) and SY-141 (from ICI). A variety of other dyes and pigments can potentially be used as well, including, but not limited to Solvent Yellow 613914 by Pylam Products Co., Inc., Projet Black BR by Zeneca, Inc. In addition, various combinations of antioxidants, color stabilizers and hardening agents may also be used in the ink compositions.

In an embodiment of the invention, the resin used as a base and binder (Sylvamid E-5) may be transparent and relatively viscous. As a result, a thinner or solvent material is needed to dissolve the resin. The resulting mixture has a viscosity of generally less than 30 cps at the operating temperature of the jet pack in the printer. When an opaque thinner such as CPH-380 N, is used, the resultant mixture of resin and thinner tends to be opaque. Next the transparency enhancer, an unsaturated amide, such as Glyclube VL (which is also opaque), is added to the mixture. At this point the mixture becomes transparent once again. This is believed to be due to the unsaturated structure of ethylene bis-oleamide.

Favorable results have been obtained with a ratio of transparency enhancer to resin of greater than or equal to 1 to 1. More preferable is a ratio in the range of 1.5 and 3.5 to 1. Higher ratio's can also be used, though it is expected that a ratio of greater than 10 to 1 would not be preferable due to the small relative amount of resin.

Inks made according to certain preferred embodiments of the present invention change from solid to liquid phase in the range of about 65° C. to 80° C., and the operating temperature of various embodiments may be in the range of about 120° C.–140° C. Once the melted ink is jetted onto a substrate, it cools and solidifies In order to more fully illustrate this invention and several preferred embodiments of the invention, the following examples of inks were made from the formulas below.

TABLE 1

| Composition of Vehicle and Inks (wt %) | | | | |
| --- | --- | --- | --- | --- |
| Ingredients | Vehicle | Magenta | Yellow | Cyan |
| CPH-380N (thinner) | 55 | 51 | 50 | 51 |
| Glycolube VL (enhancer) | 27 | 19 | 19 | 20 |
| Sylvamid E-5 (resin base) | 18 | 9 | 9 | 9 |
| SR-49 (colorant) | | 1 | | |
| SY-141 (colorant) | | | 1 | |
| SB-70 (colorant) | | | | 2 |
| hardening agent | | 9 | 9 | 9 |

TABLE 1-continued

| Composition of Vehicle and Inks (wt %) | | | | |
| --- | --- | --- | --- | --- |
| Ingredients | Vehicle | Magenta | Yellow | Cyan |
| viscosity adjusting agent | | 10 | 9 | 9 |
| anti-oxidant | | 1 | 3 | |

EXAMPLES

The ink vehicle (no colorant), as well as magenta, yellow, and cyan colored inks according to embodiments of the present invention were produced, using the ingredients listed in the columns above. First, a vessel used for containing and mixing the ingredients was heated to 115°–120° C. Next the CPH-380N and Glycolube VL were mixed together in the vessel in the amounts listed above. Then Sylvamid E-5 was added. A combination of hardening, viscosity and antioxidizing agents were also added to the ink compositions. Next the components were mixed, and when the resins were completely dissolved, the dye was added to make the various colored inks. The composition was mixed for two to four hours, depending on the color, and then filtered.

To prepare samples for transparency measurements, a drawbar method was used, wherein the ink was melted and heated to a temperature of about 130° C. A small amount of ink, approximately, 4 ml, was placed on top of a 2 inch by 3 inch piece of transparency film. A heated drawbar was then pulled slowly across the ink, resulting in a thin film of ink having a thickness of about 0.75 mil.

The transmittance of various ink samples was determined using a Macbeth Color Eye instrument to measure the transmittance and reflectance. The instrument was first calibrated using a Barium White calibration tile. Samples were placed in the appropriate cell holder (reflectance or transmittance) in the instrument and the reflectance and transmittance values and spectral curves recorded.

The CIE color coordinates including lightness ($L^*$), redness-greenness ($a^*$), and yellowness-blueness ($b^*$) values were calculated from the transmission and reflection data. The $L^*$ value relates to the amount of light which passed through or was reflected by a sample, and the $a^*$ and $b^*$ values specify the color of the light. The data for each sample is shown in Table II below. Measurement conditions for vehicle were: illuminant C, 2 degree observer angle, wavelength interval 20 nm; measurement conditions for ink samples were: illuminant F, 10 degree observer, wavelength interval 20 nm.

TABLE II

| Lightness and Color Data for Vehicle and Inks | | | | |
| --- | --- | --- | --- | --- |
| | Vehicle | Magenta | Yellow | Cyan |
| Transmittance | | | | |
| $L^*$ | 92.65 | 64.26 | 89.18 | 72.60 |
| $a^*$ | 0.05 | 48.51 | −5.39 | −26.55 |
| $b^*$ | 0.26 | −34.05 | 43.88 | −23.01 |
| Reflectance | | | | |
| $L^*$ | — | 55.77 | 87.39 | 61.39 |
| $a^*$ | — | 59.12 | −5.09 | −35.53 |
| $b^*$ | — | −38.65 | 72.46 | −40.15 |

As compared with other hot melt inks, the vehicle and inks made according to the above examples all had relatively high L* values, and good color properties as evidenced by the a* and b* values. Furthermore, the percentage of light transmitted through a 15.5 μm thick sample of the vehicle alone was 97.55% of that transmitted through the transparency film alone. The following equation was then used to obtain a standard 20 μm thickness value:

$$T = T_1 \left( \frac{b_d}{b_c} \right)$$

where $T_1$ equals the sum of the transmission values over the wavelength spectrum of the film plus ink over the sum of the transmission values of the film alone (in this case equal to 0.9755 or 97.55%); $b_c$ equals the thickness of the sample ink layer on the film (in this case ≈15.5 μm); and $b_d$ equals the desired thickness (in this case 20 μm).

Various test samples, including partial and solid fill, for both primary (one layer of ink) and secondary (two layers of ink) colors showed little or no cracking, even after the samples were folded. The color samples also exhibited good adhesion to the transparency film (i.e. ink was not removed from the transparency film when rubbed with a finger), and a low volume shrinkage (about 6%). The vehicle alone was also found to have about a 6% volume shrinkage value. A low volume shrinkage is desirable because it reduces jet failures due to the ingestion of air during the freezing of the ink in the jet. A low volume shrinkage also reduces the tendency of printed samples to curl when covered with a large amount of ink.

Other ink embodiments with similar compositions to those set forth in Table I have been fabricated and also showed improved transmission results. Favorable results are expected from formulations within the following compositional (wt %) ranges of main ingredients: 35–75% thinner, 15–35% enhancer, and 5–25% base. A certain percentage additional ingredients may also be added to the ink compositions. These additional ingredients are typically used in the manufacture of inks, and the amount of each used may vary with each dye. They are primarily added to help control the hardness and viscosity, and to avoid oxidation and promote color stabilization (e.g. resistance to U.V. light degradation).

Other embodiments of the present invention containing an unsaturated bis-amide were fabricated and compared with similar embodiments not containing an unsaturated bis-amide, as shown in Table III. One embodiment, designated as sample X, contained an unsaturated polyamide enhancer (Glycolube VL), a monoamide (CPH-380N) and a tetra-amide (UNIRE-2970, from Union Camp). This sample was compared with a sample, designated sample W, which contained a monoamide and a tetra-amide, with no unsaturated bis-amide enhancer.

The results of this comparison indicate that the presence of the unsaturated bis-amide significantly improved the transmissive properties when compared with a composition comprising a monoamide and tetra-amide alone.

Another embodiment, designated sample Z, comprised carnauba wax, behenic acid (from Croda), acrylic resin (Acroloid DM-55 from Rohm & Haas), a colorant, and an unsaturated bis-amide (Glycolube VL). Sample Y contained the same ingredients minus the unsaturated bis-amide. Transmission measurements once again showed that the presence of the unsaturated bis-amide significantly increased the transmissive properties.

TABLE III

Comparison of compositions with and without unsaturated bis-amide.

| Comparison A | | |
|---|---|---|
| | Sample W | Sample X |
| ingredients (wt %) | | |
| CPH-380N (monoamide) | 75 | 55 |
| Glycolube VL (unsat. bis-amide) | 0 | 27 |
| UNIRE-2970 (tetra-amide) | 25 | 18 |
| transmission data | | |
| % T (transmission) | ≈25 | ≈99 |
| L* | 51.13 | 92.98 |
| a* | 4.75 | 0.22 |
| b* | 18.37 | 1.84 |

| Comparison B | | |
|---|---|---|
| | Sample Y | Sample Z |
| ingredients (wt %) | | |
| carnauba wax | ≈47 | 37 |
| behenic acid | ≈47 | 37 |
| acrylic resin | ≈4 | 4 |
| colorant | ≈2 | 2 |
| unsaturated bis-amide | 0 | 20 |
| % T (transmission) | ≈29 | ≈50 |

The scope of the present invention is not limited to the embodiments discussed above. Based on the above description, one skilled in the art will understand that many modifications may be made without departing from the spirit and scope of the invention.

What is claimed is:

1. A hot melt ink comprising a monoamide, an unsaturated amide, and a tetra-amide.

2. A hot melt ink as in claim 1, wherein the monoamide comprises a hydroxyamide.

3. A hot melt ink according to claim 1, wherein the unsaturated amide is an alkene having 13–54 carbon atoms and comprising at least one amide group.

4. A hot melt ink according to claim 1, wherein the unsaturated amide is a bis-amide.

5. A hot melt ink according to claim 1, wherein the unsaturated amide has the general formula RCONR'(CH$_2$)$_x$NR"COR'"

wherein at least one of R and R'" is an alkenyl group containing from 5 to 23 carbon atoms;

R' and R" are independently selected from the group of hydrogen, alkyl or alkylene oxide condensation groups; and x is within the range of 1 to 6.

6. A hot melt ink according to claim 1 wherein the unsaturated amide is selected from the group consisting of oleamide, erucamide, and ethylene bis-oleamide.

7. A hot melt ink as in claim 1, wherein the monoamide is a hydroxyamide and the unsaturated amide is ethylene bis-oleamide, having the following structure:

(CH$_3$)—(CH$_2$)$_7$—(CH)=(CH)—(CH$_2$)$_7$—(C=O)—(NH)—(CH$_2$)—(CH$_2$)—(NH)—(C=O)—(CH$_2$)$_7$—(CH)=(CH)—(CH$_2$)$_7$—(CH$_3$).

8. A hot melt ink as defined in claim 1, wherein the ratio of unsaturated amide to tetra-amide is at least 1 to 1.

9. A hot melt ink as defined in claim 1, wherein the ratio of unsaturated amide to tetra-amide is in the range between and including 1.5 to 1 and 3.5 to 1.

10. A hot melt ink vehicle as defined in claim 1, wherein the ratio of unsaturated amide to tetra-amide is in the range between and including 1.5 to 1 and 2.2 to 1.

11. A hot melt ink vehicle as defined in claim 1, further comprising at least one coloring agent.

12. A hot melt ink further comprising at least one coloring agent as defined in claim 11, wherein the at least one coloring agent is a material selected from the group consisting of a dye and a pigment.

13. A hot melt ink comprising a monoamide, a tetra-amide, and an unsaturated bis-amide.

14. A hot melt ink comprising an unsaturated bis-amide, carnauba wax, behenic acid, acrylic resin, and a coloring agent.

* * * * *